July 8, 1924.
C. R. NALLE
ADJUSTABLE CASTER
Filed May 22, 1923
1,500,465
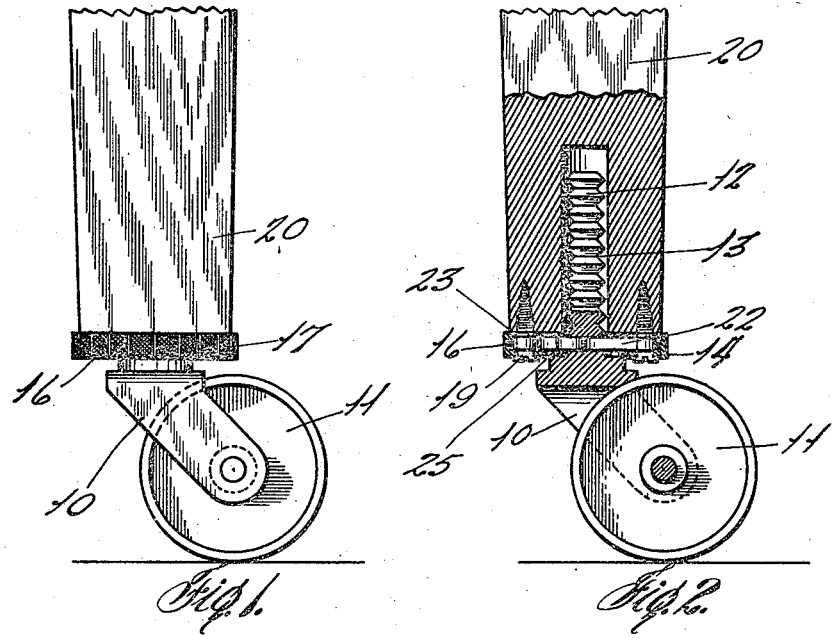
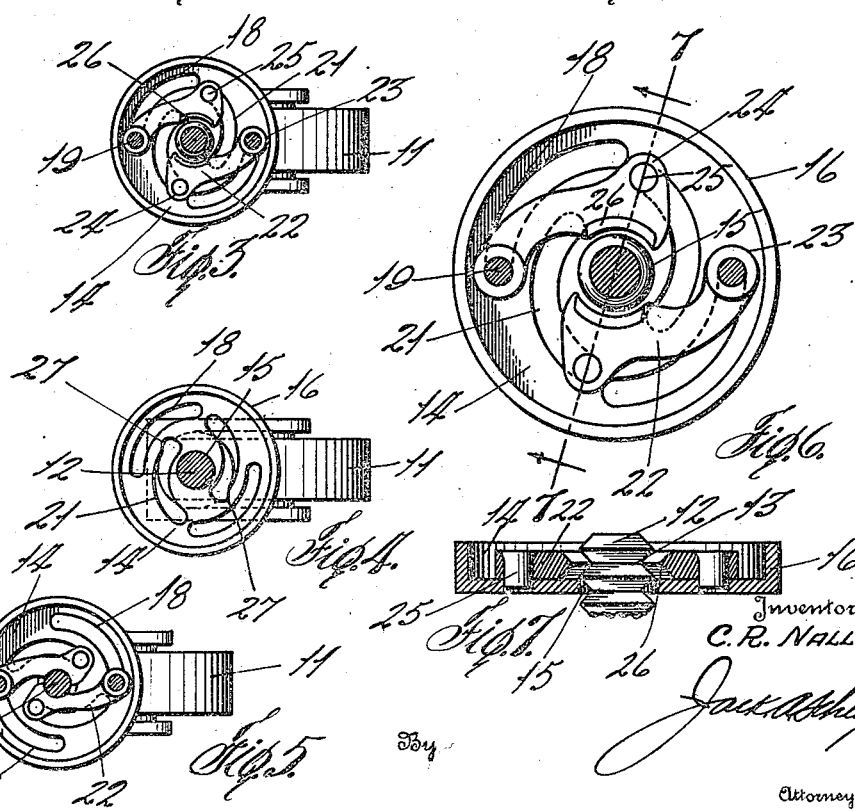
Inventor
C. R. NALLE
By Jack A. Ashley
Attorney Patented July 8, 1924.

1,500,465

UNITED STATES PATENT OFFICE.

CHARLES R. NALLE, OF WICHITA FALLS, TEXAS.

ADJUSTABLE CASTER.

Application filed May 22, 1923. Serial No. 640,638.

*To all whom it may concern:*

Be it known that I, CHARLES R. NALLE, a citizen of the United States, residing at Wichita Falls, in the county of Wichita and State of Texas, have invented certain new and useful Improvements in Adjustable Casters, of which the following is a specification.

This invention relates to new and useful improvements in adjustable casters.

Considerable annoyance is occasioned by the wabbling and tilting of tables, chairs and other pieces of furniture, supported on casters, due to the fact that all of the casters do not rest upon the floor. This is caused either by the unevenness of the floor or the warping of the furniture. This condition is particularly disconcerting in dining tables.

The object of my invention is to provide a caster which may be easily and expeditiously adjusted vertically without tilting or otherwise disturbing the piece of furniture supported by said caster.

A further object is to provide a simple and compact device which may form part of the caster and present a neat appearance, all of the parts except the operating member being concealed.

A construction designed to carry out the invention together with other features will be hereinafter fully described.

The invention will be more readily understood from a reading of the following specification and by reference to the accompanying drawings, in which an example of the invention is shown and wherein:

Fig. 1 is a side elevation of a caster constructed in accordance with my invention, Fig. 2 is a vertical sectional view of the same, Fig. 3 is a plan view of the caster with the locking dogs open, Fig. 4 is a plan view, the dogs having been removed, Fig. 5 is a view similar to Fig. 3, the dogs being locked, Fig. 6 is an enlarged plan view of the locking disk, and Fig. 7 is a cross-sectional view taken on the line 7—7 of Fig. 6.

In the drawings the numeral 10 designates the yoke of a caster in which the usual wheel 11 is journaled. The yoke has an upright stem 12, which is provided with annular grooves 13.

A locking disk 14 is provided with a central opening 15 through which the stem is passed upwardly. The disk has an upstanding marginal flange 16, the outer face of which may be milled and provided with notches 17 for receiving a coin or other article to provide leverage for turning the disk.

A pair of diametrically opposite concentric slots 18 are provided in the disk and receive wood screws 19 which are inserted in the bottom of the leg 20 to which the caster is attached. The disk thus supported by the screws is free to rotate the lengths of the slots. Between the slots 18, eccentric slots 21 are located on each side of the opening 15. A pair of locking dogs 22 are pivoted on the screws 19 and have annular bosses 23 surrounding said screws and bearing against the underside of the leg.

Each dog has an ear 24 at one end and a stud 25 depending from the same and engaging in one of the slots 21. Each dog has an accurate bevelled edge 26 conforming to the contour of the stem 12 and adapted to engage in the grooves 13. When the studs are at the inner ends of the slots 21, as is shown in Figs. 2 and 5, the edges 26 will be in one of the grooves and the dogs will thus support the legs 20 on the stem.

By rotating the disk 14 the studs will ride outwardly in the eccentric slots, whereby the dogs will be swung outwardly as is best shown in Figs. 3, 4, 6 and 7. This withdraws the edges 26 from the grooves and permits a free vertical movement of the stem 12 for making adjustments. Inwardly offset notches 27, as is shown in Fig. 4, may be provided in the inner ends of the slots 21, so that when the dogs are engaged in the grooves, an additional movement of the disk will throw the studs into said notches and thus lock the parts in position.

In using the device it is merely necessary to rotate the disk 14 by means of the flange 16. If the disk does not turn readily, due to the weight on the dogs, a coin or other article may be inserted edgewise, in one of the recesses 17 to provide leverage. When the disk is rotated in a clockwise direction the studs 25 will be swung outwardly in the slots 21, whereby the dogs 22 will be swung so as to withdraw their edges 26 from the groove 13, as is shown in Fig. 7.

The stem 12 is free to move vertically and if the caster wheel 11 has not been touching the floor, it will drop; or, if the leg has been elevated too much, the stem will move up into the leg. When the stem has been properly adjusted the disk 14 is rotated in a counter-clock-wise direction, whereby the studs 25 are moved inwardly in the slots 21 and the edges 26 caused to seat in one of the grooves 13. When the studs ride into the notches 27 the dogs are locked against accidental displacement.

By this device a table or other article of furniture may be leveled in a quick and easy manner without disturbing the furniture or interfering with its use. Various changes in the size and shape, as well as modifications may be made within the scope of the appended claims.

What I claim is,

1. In an adjustable caster, the combination with a caster having a stem provided with grooves, of a rotatable adjusting member, pivoted locking dogs adapted to engage in the grooves of the stem, and connections between the dogs and the member for swinging the said dogs into and out of the grooves when the member is rotated.

2. In an adjustable caster, the combination with a caster having a stem provided with grooves of a rotatable disk having eccentric slots, and pivoted dogs having projections engaging in said slots, said dogs having arcuate edges engaging in the grooves of said stem.

3. In a caster adjusting device, a disk having a central open for receiving the stem of a caster and a pair of concentric openings for supporting screws, said disk also having a pair of eccentric slots, and a pair of locking dogs, each having a stud engaging in one of the eccentric slots and a reduced edge for engaging a caster stem, said dogs being pivoted.

4. In an adjustable caster, a horizontally supported rotatable member, a caster having stem extending vertically through said member and having circumferential grooves, and locking elements for engaging the grooves of the stem and disposed horizontally over the said member and connected therewith for operation by the rotation of said member.

In testimony whereof I affix my signature.

CHARLES R. NALLE.